United States Patent
Goluszek et al.

(10) Patent No.: US 8,283,896 B1
(45) Date of Patent: Oct. 9, 2012

(54) METHOD AND SYSTEM FOR CHARGING AND DISCHARGING HIGH-VOLTAGE ENERGY STORAGE DEVICES

(75) Inventors: Daniel Goluszek, El Dorado Hills, CA (US); Lawrence W. Goins, El Dorado Hills, CA (US)

(73) Assignee: Polarity, Inc., Rancho Cordova, CA (US)

( * ) Notice: Subject to any disclaimer, the term of this patent is extended or adjusted under 35 U.S.C. 154(b) by 306 days.

(21) Appl. No.: 12/790,306

(22) Filed: May 28, 2010

Related U.S. Application Data

(60) Provisional application No. 61/183,763, filed on Jun. 3, 2009.

(51) Int. Cl.
  *H02J 7/04* (2006.01)
  *H02J 7/16* (2006.01)
  *H02M 3/335* (2006.01)
  *H02H 7/00* (2006.01)

(52) U.S. Cl. .......... 320/145; 320/140; 320/141; 363/17; 363/51

(58) Field of Classification Search .................. 320/140, 320/141, 145; 363/17, 51
See application file for complete search history.

(56) References Cited

U.S. PATENT DOCUMENTS

| | | | |
|---|---|---|---|
| 3,715,649 A | 2/1973 | Ravas | |
| 5,166,870 A | 11/1992 | Shimizu et al. | |
| 5,734,258 A | 3/1998 | Esser | |
| 6,031,359 A * | 2/2000 | Michelsen et al. | 320/141 |
| 6,246,598 B1 | 6/2001 | Tarter et al. | |
| 7,145,786 B2 * | 12/2006 | Vinciarelli | 363/17 |
| 7,336,056 B1 * | 2/2008 | Dening et al. | 323/222 |
| 2008/0094019 A1 | 4/2008 | Steigerwald et al. | |

* cited by examiner

*Primary Examiner* — M'Baye Diao
(74) *Attorney, Agent, or Firm* — Silicon Edge Law Group LLP; Arthur J. Behiel

(57) ABSTRACT

An energy storage device includes buck and boost switches that charge and discharge a charge storage element (e.g. a supercapacitor or ultracapacitor) over a broad voltage range. Integrated charge limiting prevents the storage element from sinking a potentially damaging level of current. Pulse-width modulated control signals are combined with higher-frequency signals to allow the resulting modulated control signals to pass through relatively small, inexpensive isolation transformers. Pairs of control signals may be combined to produce composite control signals that turn power switches on and off, or may be used to separately turn the power switches on and off.

24 Claims, 5 Drawing Sheets

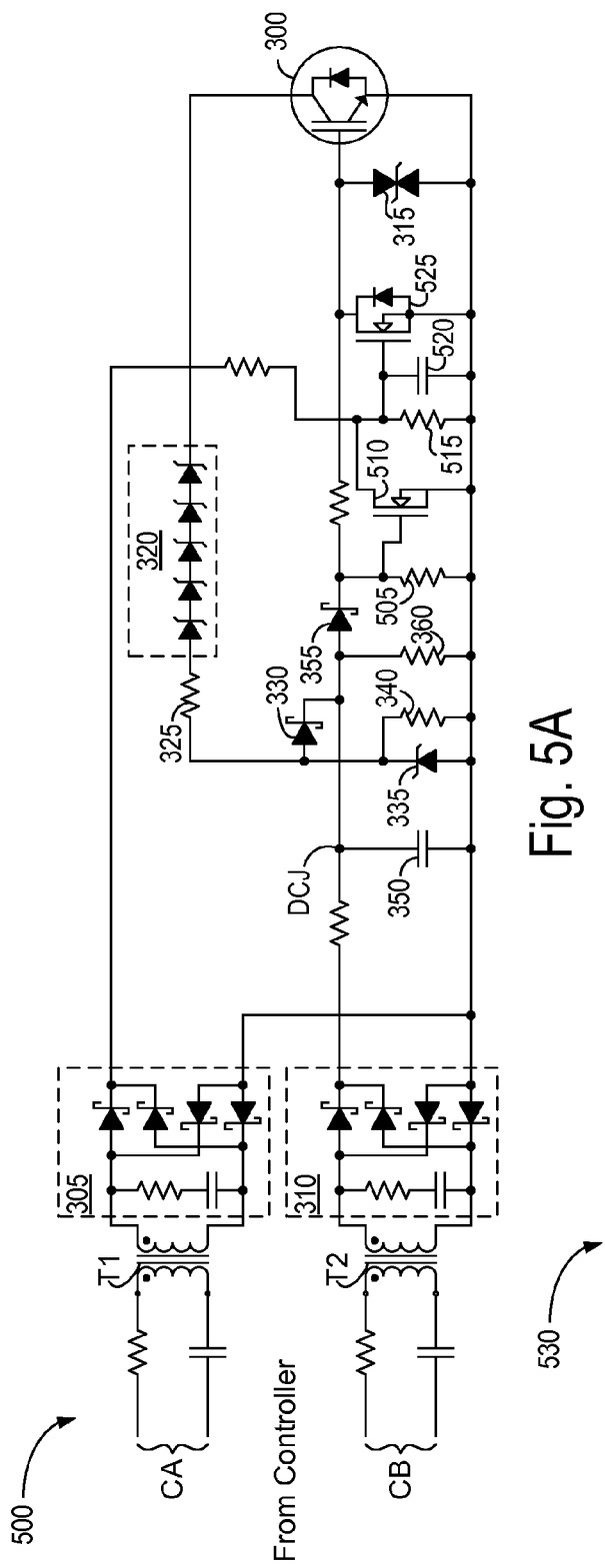
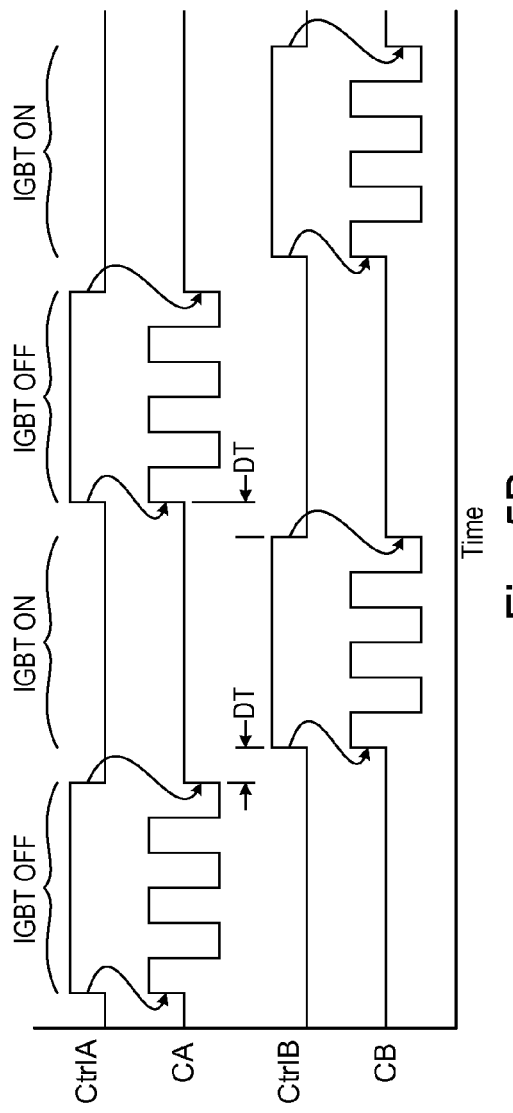
Fig. 5A
Fig. 5B

METHOD AND SYSTEM FOR CHARGING AND DISCHARGING HIGH-VOLTAGE ENERGY STORAGE DEVICES

FIELD

This invention relates to devices for efficiently delivering regulated power from a high-voltage storage device that operates over a broad voltage range.

BACKGROUND

Emerging applications for DC-to-DC converters require high efficiency conversion of relatively high input voltages. For example, a high-energy storage device described in U.S. Pat. No. 7,033,406 purports to safely store charge at 3,500 volts. This voltage will have to be down converted efficiently and regulated for use with equipment that requires relatively lower supply voltages. For example, conventional battery-powered motor vehicles might benefit from a high-energy storage device, but the electric motors employed to drive them typically require input voltages far lower than 3,500 volts. Voltage converters suitable for this task should be robust, inexpensive, and compact to ensure commercial viability.

BRIEF DESCRIPTION OF THE DRAWINGS

The subject matter disclosed is illustrated by way of example, and not by way of limitation, in the figures of the accompanying drawings and in which like reference numerals refer to similar elements and in which:

FIG. 5A depicts a switching element 500 that is an alternative to the embodiment of FIG. 3.

FIG. 5B is a waveform diagram 530 illustrating how a controller similar to controller 165 (FIG. 1) can use carrier signals CA and CB to turn IGBT 300 on and off in the embodiment of FIG. 5A.

DETAILED DESCRIPTION

Figure 1:
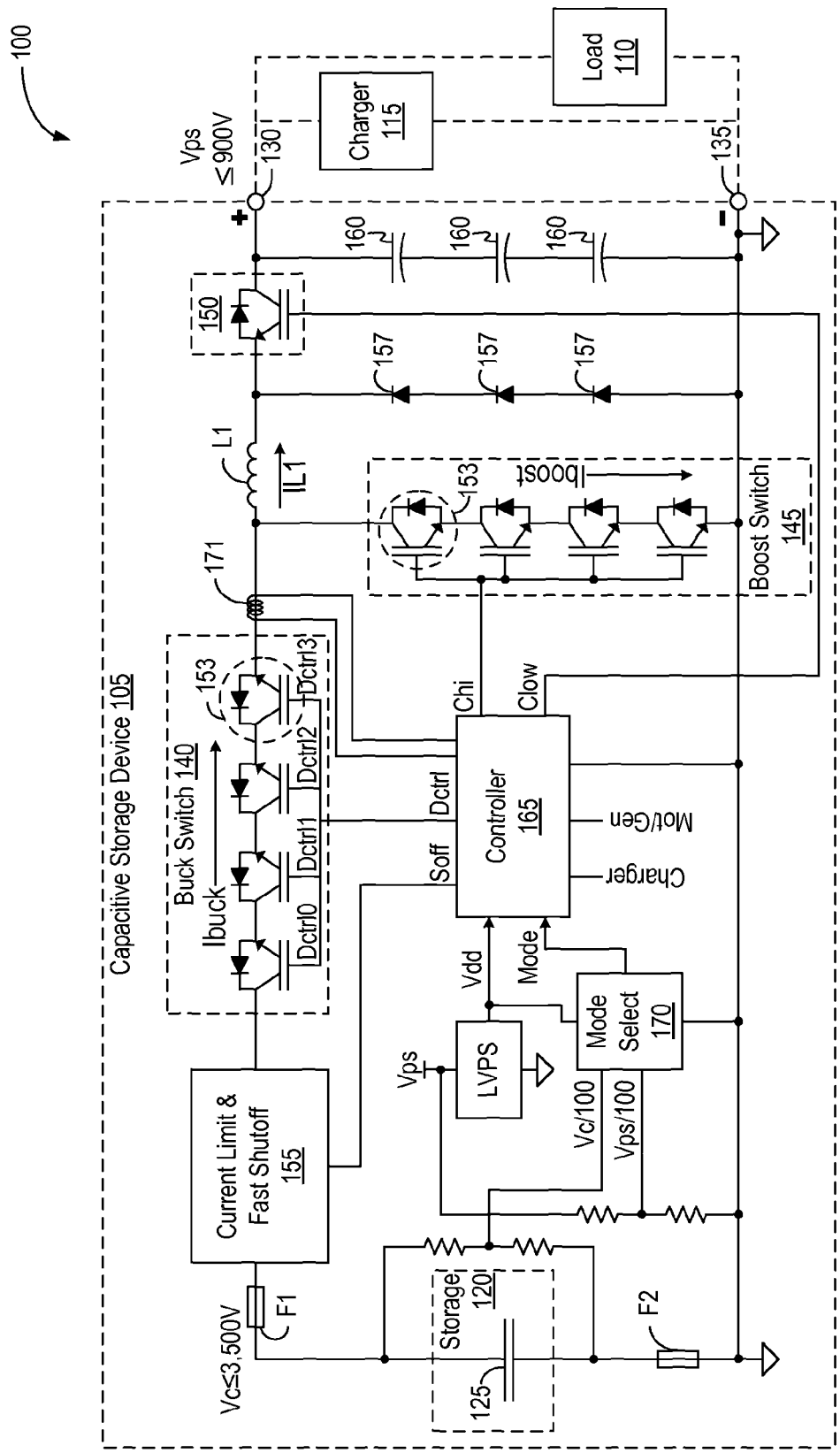
FIG. 1 depicts a power-delivery system 100 in which a capacitive storage device 105 delivers power to a load 110, and alternatively receives power from a charger 115.

FIG. 1 depicts a power-delivery system 100 in which a capacitive storage device 105 delivers power to a load 110, and alternatively receives power from a charger 115. As detailed below, in some embodiments load 110 is an electric motor and motor controller. System 100 can capture and store regenerative-breaking energy provided by the load in some embodiments.

Storage device 105 includes three subsections. First, a charge-storage device 120, such as an ultracapacitor 125, stores charge for delivery to load 110 via relatively positive and negative supply terminals 130 and 135. Second, a collection of active and inactive circuit elements direct the flow of current to and from charge-storage device 120. The active circuit elements include a buck switch 140, a boost switch 145, a recharge-limit switch 150, and a shutoff switch 155. Each of switches 140, 145, and 150 includes at least one switching element 153, which in turn includes a power transistor with its current-handling terminals (e.g., collector and emitter) connected in parallel with a diode and in series with the other transistors.

Within each switch, the switching elements 153 act in unison to turn the switch on and off, and thus to selectively pass current between the switch's current-handling terminals. Each collection of switching elements 153 (e.g., switches 140 and 145) thus behaves as a single high-voltage switching element. In the example of FIG. 1, switch 140 switches nearly 3,500VDC between its first and second current-handling terminals, the collector of the leftmost switching element 153 and the emitter of the rightmost switching element 153. Switch 145 likewise switches nearly 3,500VDC between its two current-handling terminals, which may be termed third and fourth current-handling terminals to distinguish them from those of switch 140. Recharge limit switch 150 likewise includes two current-handling terminals, which may be termed fifth and sixth current-handling terminals to distinguish them from those of the other switches.

The inactive elements include an inductor L1, fuses F1 and F2, a series of diodes 157, and a series of capacitors 160. The third subsection of storage device 105 controls the active circuit elements, and thus the flow of current to and from storage device 120. This subsection includes a controller 165, a low-voltage power supply LVPS, and mode-select logic 170.

In the depicted embodiment capacitor 125 provides a capacitor voltage Vc of up to about 3,500V. Storage device 105 can charge capacitor 125 to 3,500V using power from charger 115 and can use the resulting voltage Vc to produce a regulated supply voltage Vps of about 900V for load 110. Storage device 105 accomplishes this charging and discharging in the following four operational modes:

I. Low-voltage charge mode (LVCM): Charger 115 or load 110 applies over 900V across terminals 130 and 135 while capacitor voltage Vc is less than or equal to 900V (i.e., Vc<900V and Vps>900V). Controller 165 turns on switches 140 and 155 and turns off switch 145. To protect charger 115 from a potentially harmful level of current, controller 165 modulates signal Clow to switch 150 to keep the current through inductor L1 below a desired threshold. Switch 150 includes only one switching element 153 in this embodiment because the voltage across and current through switch 150 remains below the ratings for switching element 153. Diodes 157 provide a path for return current to inductor L1 when switch 150 is periodically turned off in this mode.

II. High-voltage charge mode (HVCM): Charger 115 or load 110 applies over 900V across terminals 130 and 135 while capacitor voltage Vc is over 900V (i.e., Vc>900V and Vps>900V). Controller 165 turns on switches 150 and 155, turns off switch 140, and modulates signal Chi to boost switch 145. The PWM signal Chi turns switch 145 on and off, and thus produces periodic pulses of current Iboost through inductor L1. The inductive kicks from turning off switch 145 send current pulses through the series of diodes in switch 140 to charge capacitor 125 above 900V.

III. High-voltage discharge mode (HVDM): Voltage Vc is about 900V and load 110 is drawing charge from terminals 130 and 135, which tends to reduce voltage Vps (i.e., Vc>900V and Vps<900V). Controller 165 turns on switches 150 and 155, turns off switch 145, and modulates signal Dctrl to buck switch 140. The PWM signal Dctrl turns switch 140 on and off, and thus produces periodic pulses of current Ibuck through inductor L1. The inductive kicks from turning off switch 140 pass through load 110 and return to inductor L1 via the series of diodes in switch 145.

IV. Low-voltage discharge mode (LVDM): Voltage Vc is less than or equal to 900V and load 110 is drawing charge from terminals 130 and 135 (i.e., Vc<900V and Vps<900V). Controller 165 turns on switches 140, 150, and 155 and turns off switch 145. Load 110 is able to draw down voltage Vc below 900V.

In the depicted embodiment, mode select logic 170 determines the operational mode by considering capacitor voltage Vc and supply voltage Vps. Voltage dividers divide voltages Vc and Vps by 100 to produce signals Vc/100 and Vps/100 to mode select logic 170. Mode select logic 170 can then find the operational mode by simply determining how signals Vc/100 and Vps/100 compare with a 9V reference (not shown). The resulting mode is conveyed to controller 165 as signal Mode. Controller 165 then uses the detected mode to operate the active components as summarized above. Mode select logic 170 and controller 165 are powered by a relatively low internal supply voltage Vdd conventionally derived from supply voltage Vps by internal supply LVPS. The internal voltage may also be supplied from an external source.

In some embodiments controller 165 receives additional inputs, and may support more, fewer, or different operational modes. For example, controller 165 may receive signals to indicate the presence and capacity of charger 115 and adjust the charging rate accordingly. Controller 165 may also receive signals from an attached motor controller indicating e.g. whether an attached motor is operating as a generator or a load. In the example shown, controller 165 can issue a shut-off signal Soff to shutoff switch 155 if a current sensor 171 indicates an over-current condition. Fuses F1 and F2 provide an additional measure of safety. Switch 155 uses e.g. insulated gate bipolar transistors (IGBTs) to quickly disconnect storage device 120 in the event of catastrophic failure or loss of system control. Switch 155 should be capable of disconnecting, with a suitable guard band, the maximum short-circuit current from storage device 120 at the maximum rated voltage.

Figure 2:
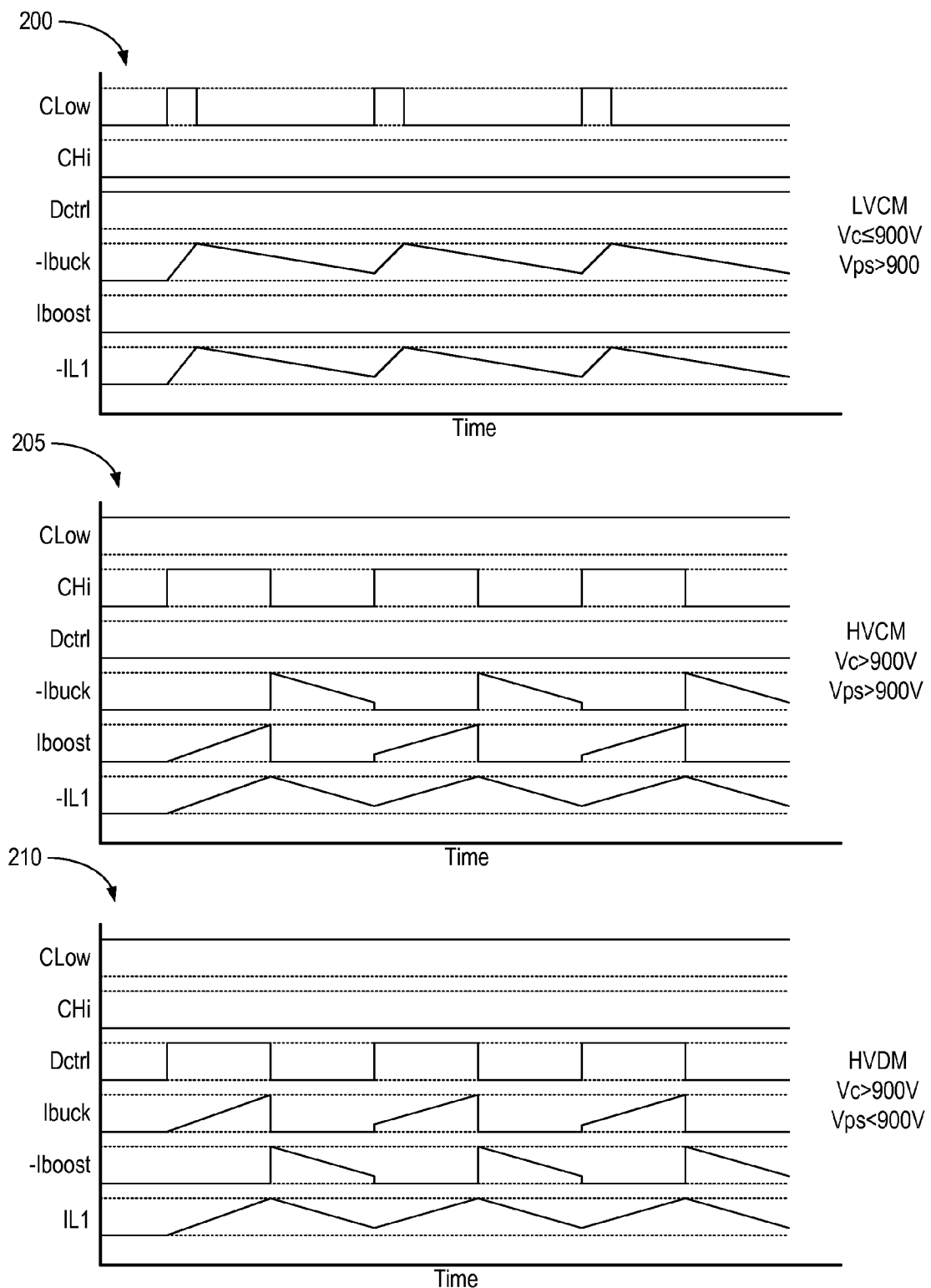
FIG. 2 depicts three waveform diagrams 200, 205, and 210 illustrating the first three modes listed previously, and in the same order.

FIG. 2 depicts three waveform diagrams 200, 205, and 210 illustrating the first three modes listed previously, and in the same order. The PWM signals are illustrative, and not to scale. The signals are named for like-named nodes in FIG. 1. Some of the signal names are preceded with a minus sign to indicate that their sense is opposite the direction of current flow shown in FIG. 1. An illustration of the LVDM mode is omitted because signals are not modulated in that mode.

Figure 3A:
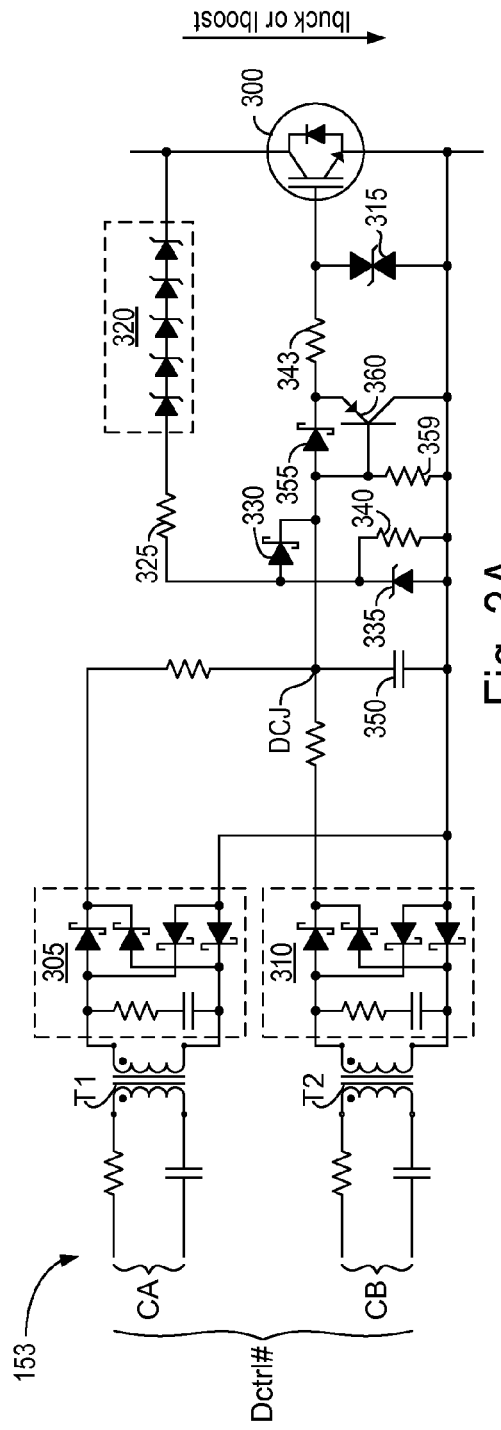
FIG. 3A depicts a switching element 153, four of which are used in series for each of buck switch 140 and boost switch 145 in one embodiment.

FIG. 3A depicts a switching element 153, four of which are used in series for each of buck switch 140 and boost switch 145 in one embodiment. A power-switching device 300 serves as the switch. In this embodiment, switching device 300 is an insulated gate bipolar transistor (IGBT) rated at 1,200V and 50 A. The IGBT includes an internal diode between the emitter and collector, but an external device can be used with or instead of the internal one in other embodiments. The remaining circuitry both controls IGBT and protects it from over-voltage conditions.

Controller 165 (FIG. 1) delivers discharge-control signal Dctrl# to element 153 as a pair of complementary carrier signals CA and CB to respective transformers T1 and T2. The transformers convey the carrier signals to a respective pair of rectifiers 305 and 310. Each rectifier produces a rectified signal that exhibits a first voltage when the respective carrier signal is of a relatively high frequency, and a second, lower voltage when the respective carrier signal is of a relatively lower frequency. The two rectified signals are added at junction DCJ and the sum is used to turn IGBT 300 on and off. The operation of switching element 153 is detailed below in connection with FIG. 3B.

A transient-voltage suppressor 315 protects the gate-emitter junction of switching device 300 from excessive voltage. A network 320 of transient voltage suppressors, a resistor 325, and a zener diode 330 limit the collector-emitter voltage of switching device 300 to a level below the safe operating voltage by preventing the IGBT from turning off more quickly or on more slowly than the other series IGBTs. Assume, for example, that switching device 300 were to turn on more slowly than the other three IGBTs in the series. Nearly 3,500V could be felt across the IGBT, a level far above the 1,200V rating. Network 320 prevents this destructive condition by biasing transistor 300 on should the voltage across network 320 increase above the selected breakdown voltage. Keeping switching device 300 out of the cutoff mode shunts current from collector to emitter, thereby lowering the dynamic impedance of switching device 300, and hence lowering the collector-emitter voltage. The clamping voltage between the collector and emitter can be adjusted by e.g. adding or subtracting from the number of transient voltage suppressors in network 320.

Diode 330 isolates node DCJ from the series capacitance related to network 320 and switching device 300. A diode 335 and resistor 340 prevent an over-voltage condition from damaging zener diode 330. Current passing thru network 320 develops voltage across resistor 340. This voltage is coupled to the gate of the switching device 300 via diode 330, diode 355 and a gate resistor 343. Diode 330 also blocks the gate drive transformer current from being shunted by the low value resistor 340. Zener diode 335 is for over-voltage protection. Resistor 325 is for current limiting in the network 320 path.

Figure 3B:
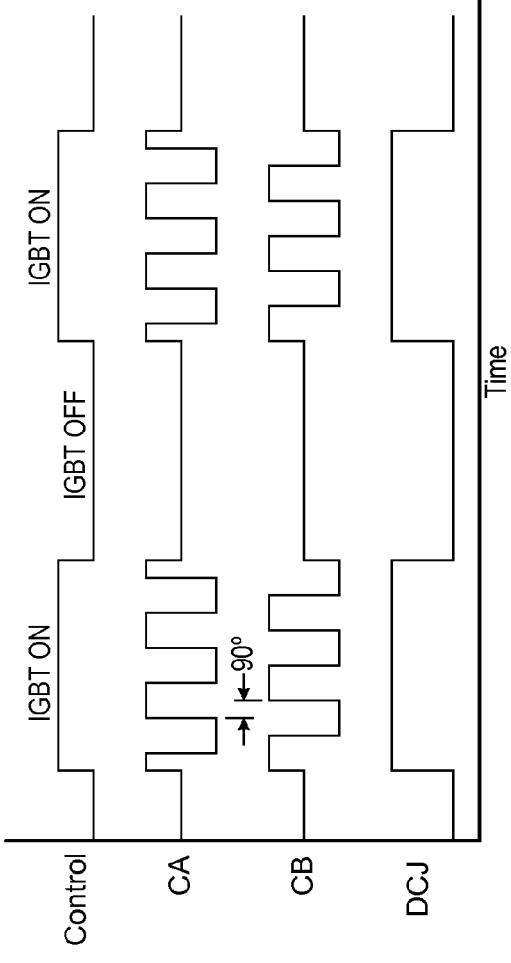
FIG. 3B is a waveform diagram 345 illustrating how controller 165 (FIG. 1) uses carrier signals CA and CB to turn IGBT 300 on and off.

FIG. 3B is a waveform diagram 345 illustrating how controller 165 (FIG. 1) uses carrier signals CA and CB to turn switching device 300 on and off. Controller 165 develops an internal pulse-width modulated control signal Control that determines the on-time for whichever switch is to be controlled, and consequently the average current flow through each of the series of switching elements 153. Returning briefly to FIG. 1, the controller 165 can adjust the RMS current through load 110 to maintain 900VDC across terminals 130 and 135 by periodically turning buck switch 140 on and off responsive to PWM control signal Control of FIG. 3A. In one embodiment control signal Control is a 1 KHz to 10 KHz signal in which the duty cycle is altered to control the voltage across terminals 130 and 135. Those of skill in the art are very familiar with the use of PWM control signals for regulated power supplies, so a detailed treatment of the circuitry used to adjust the duty cycle of control signal Control is omitted for brevity.

Returning to FIG. 3A, transformers T1 and T2 isolate the carrier signals from the voltages used to control switching device 300. Passing the 1 KHz to 10 KHz control signal Control would require relatively large and expensive transformers. Controller 165 facilitates the use of smaller, less expensive transformers by gating a pair of higher frequency signals on edges of control signal Control. The resulting pair of carrier signals CA and CB (FIG. 3B) are themselves control signals that alternate between periods of a relatively high frequency and periods of a relatively low frequency. In one embodiment, a relatively high frequency of about 500 KHz and a relatively low frequency of about zero Hz is used to define the IGBT "on" and "off" times. As in conventional PWM voltage regulators, the ratio of the on and off times determines the average current through switching device 300, and thus the power delivered to the load.

Rectifiers 305 and 310 rectify respective carrier signals CA and CB to recover a copy of control signal Control on node DCJ. The rectified versions of carrier signals CA and CB that appear at node DCJ can include notches at the switching points of the carrier signals. This embodiment reduces the impact of such notches by offsetting the two carrier signals CA and CB by e.g. 90 degrees so that their respective notches are offset, which tends to reduce noise at node DCJ. A capacitor 350 further reduces noise at node DCJ. The combined rectified carrier signals show up on node DCJ as a composite switch control signal, as shown in FIG. 3B. The composite signal DCJ is pulse-width modulated and has a duty cycle defined by control signal Control. More or fewer carrier signals and associated rectifiers can be used in switching elements for other embodiments, and the carrier frequencies and phase offsets can be optimized for a given design.

When carrier signals CA and CB are asserted, node DCJ goes high and a zener diode 355 passes charge to the gate of switching device 300, turning the switch on. When the carrier signals are deasserted, a resistor 359 bleeds charge away from node DCJ, and thereby reduces the voltage on that node. The reduced voltage on node DCJ forward biases a transistor 360, which in turn clamps the gate of switching device 300 to nearly its emitter potential. IGBT is thus turned and held off when the carrier signals are not asserted. Pairs of carrier signals like signals CA and CB are similarly issued to each switching element 153 in a given switch. For example, the switching elements 153 of buck switch 140 operate synchronously to gate current in the HVDM mode. Carrier signals CA and associated transformer T1 and rectifier 305 are omitted for each switch in some embodiments, leaving carrier signal CB to control the voltage on node DCJ.

Figure 4:
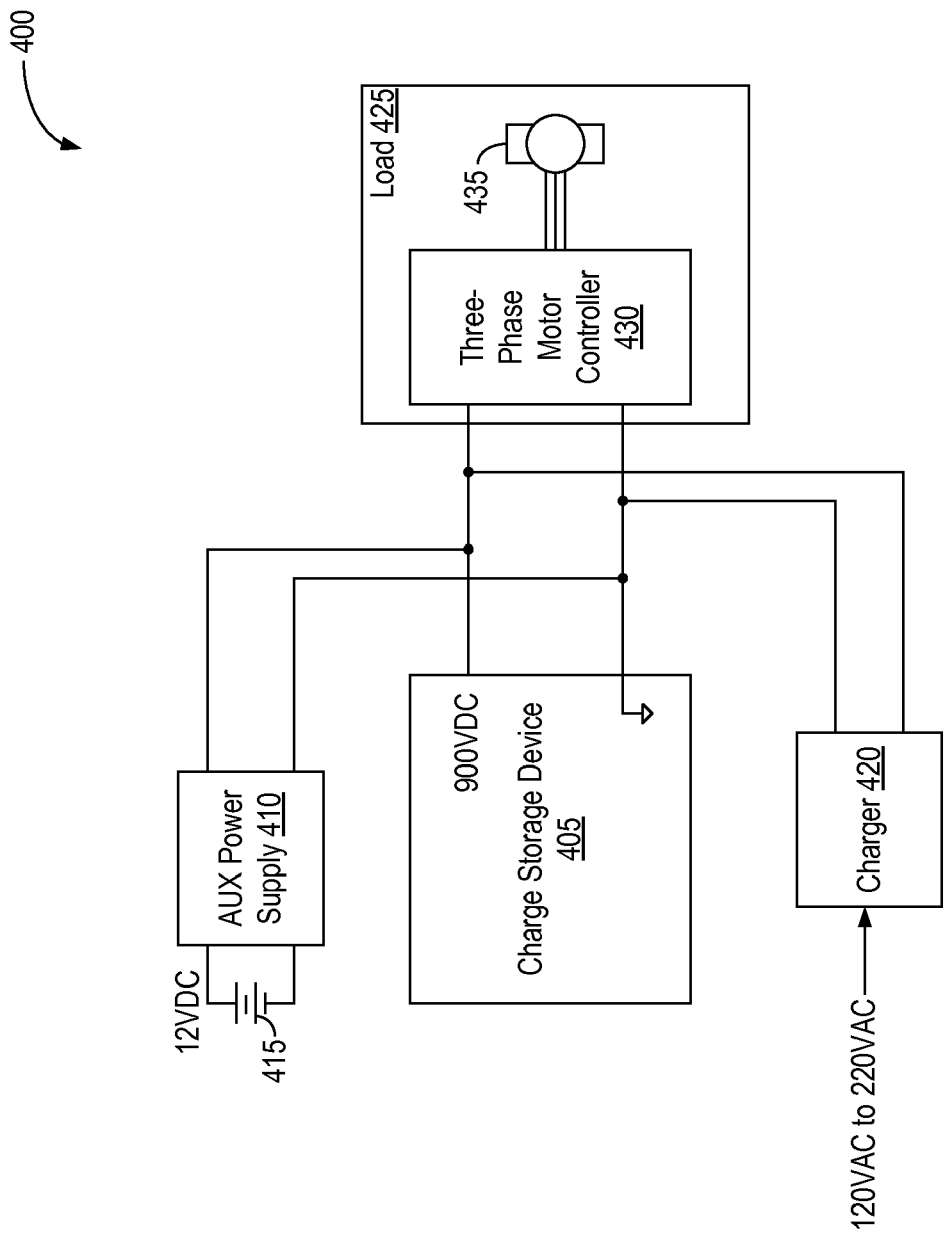
FIG. 4 depicts a power delivery system 400 in accordance with one embodiment.

FIG. 4 depicts a power delivery system 400 in accordance with one embodiment. System 400 includes a capacitive storage device 405 that can be an embodiment of the storage device detailed in connection with FIG. 1. System 400 additionally includes an auxiliary power supply 410 and associated battery 415, a charger 420, and a load 425. Load 425, in turn, includes a conventional three-phase motor controller 430 and a conventional motor 435. Auxiliary power supply 410 derives and delivers 12VDC from the regulated 900VDC. The 12VDC can then be used to charge battery 415 and power e.g. motor-vehicle accessories (e.g., lamps, radio, and control circuitry). Charger 420 conventionally employs e.g. readily available 120VAC or 240VAC power to derive and deliver charge to storage device 405. Charger 420 can be affixed more or less permanently to the remaining elements of system 400 or can be connected only for charging. Finally, load 425 can receive power, to drive motor 435, and can transmit power to recover energy from regenerative braking. Suitable power supplies, chargers, controllers, and motors are available and are well understood by those of skill in the art, so a detailed treatment of these components is omitted for brevity. Though not shown, additional signal lines can be connected between the various components of system 400 to support configuration and control features.

FIG. 5A depicts a switching element 500 that is an alternative to the embodiment of FIG. 3. Switching element is in many ways similar to element 153 of FIG. 3, with like-labeled components being the same or similar. The following discussion focuses on the differences between switching element 500 and switching element 153.

FIG. 5B is a waveform diagram 530 illustrating how a controller similar to controller 165 (FIG. 1) can use carrier signals CA and CB to turn switching device 300 on and off in the embodiment of FIG. 5A. The controller (not shown) develops a pair of pulse-width modulated control signals CtrlA and CtrlB that determine the on-times for switching element 500, and consequently the average current flow through the switch. As in the example of FIG. 1, the controller can adjust the RMS current through a load to maintain a desired output voltage.

Carrier signals CA and CB were phase offset in the example of FIGS. 3A and 3B to reduce noise, but need not have a defined phase relationship in the embodiment of FIGS. 5A and 5B. To turn switching device 300 off, the controller asserts carrier signal CA with signal CB deasserted. Control signal CtrlA initiates carrier signal CA such that the carrier signal rises from zero in phase with control signal CtrlA and the first pulse represents a full half-cycle of the carrier. With carrier signal CA asserted, rectifier 305 develops a DC voltage across a resistor 515 and a capacitor 520. This voltage turns on a transistor 525, and consequently biases switching device 300 off. The falling edges of control signals CtrlA and CtrlB need not be timed to correspond to edges of the respective gated carrier signals CA and CB.

To turn switching device 300 on, the controller deasserts carrier signal CA and asserts signal CB such that the carrier signal rises from zero in phase with control signal CtrlB and the first pulse represents a full half-cycle of the carrier. Resistor 515 bleeds the charge off the gate of transistor 525, and consequently decouples the gate and emitter of switching device 300. At the same time, rectifier 310 develops a DC voltage at node DCJ and, via diode 355, across a resistor 505. The resultant voltage turns on a transistor 510 and switching device 300. Transistor 510 helps resistor 515 bleed charge away from transistor 525, and thus expedites the turning on of the IGBT. Control signals CtrlA and CtrlB impose some dead time DT between asserted carrier signals to prevent switching element 500 from attempting to turn switching device 300 on and off at the same time, which could result in erratic switching behavior during on/off transitions.

In the foregoing description and in the accompanying drawings, specific terminology and drawing symbols are set forth to provide a thorough understanding of the present invention. In some instances, the terminology and symbols may imply specific details that are not required to practice the invention.

While the present invention has been described in connection with specific embodiments, variations of these embodiments will be obvious to those of ordinary skill in the art. For example, while the invention is described in the context of a motor for powering a vehicle, the applications for robust, inexpensive, and compact charge storage devices are myriad. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. Section 112.

What is claimed is:

1. A power supply to deliver a voltage across first and second supply terminals, the power supply comprising:
   a charge-storage device having first and second charge-storage terminals;

an inductor having first and second inductor terminals;

a buck switch having a first current-handling terminal coupled to the first charge-storage terminal, a second current-handling terminal coupled to the first inductor terminal, and a buck-switch control port;

a boost switch having a third current-handling terminal coupled to the first inductor terminal, a fourth current-handling terminal coupled to the second charge-storage terminal and the second supply terminal, and a boost-switch control port; and a recharge-limit switch having a fifth current-handling terminal coupled to the second inductor terminal, a sixth current-handling terminal coupled to the first supply terminal, and a recharge-limit control port.

2. The power supply of claim 1, further comprising a switch controller coupled to the buck-switch, boost-switch, and recharge-limit control ports.

3. The power supply of claim 2, wherein the switch controller is adapted to issue a modulated buck control signal to the buck-switch control port, a boost control signal to the boost-switch control port, and a recharge control signal to the recharge-limit control port.

4. The power supply of claim 3, wherein at least one of the boost control signal and the recharge control signal is pulse-width modulated.

5. The power supply of claim 3, wherein the charge-storage device operates over a range of storage voltages, including a lower voltage sub-range and an upper voltage sub-range, and wherein the controller, in a charging mode, issues the boost control signal to the boost-switch control port when the storage voltage is within the upper voltage sub-range and issues the recharge control signal to the recharge-limit control port when the storage voltage is within the lower voltage sub-range.

6. The power supply of claim 3, wherein the charge-storage device operates over a range of storage voltages, including a lower voltage sub-range and an upper voltage sub-range, the power supply further comprising a mode-select circuit coupled to the charge-storage device and the controller, the mode-select circuit to issue a mode signal to the controller when the storage voltage is within the upper voltage sub-range.

7. The power supply of claim 3, wherein the charge-storage device operates over a range of storage voltages, including a lower voltage sub-range and an upper voltage sub-range, and wherein the controller, in a discharging mode, issues the buck control signal to the buck-switch control port when the storage voltage is within the upper voltage sub-range and continuously enables the buck switch when the storage voltage is within the lower voltage sub-range.

8. A switch for selectively passing a current between first and second switch terminals having a voltage between them, the switch comprising:

a controller to deliver a plurality of control signals, wherein each control signal is modulated to include alternate periods of a relatively high frequency and a relatively low frequency; and a switching element coupled between the first and second switch terminals and including:

a first transformer to receive a first of the control signals, the first transformer to pass the relatively high frequency periods of the first control signal and to block the relatively low frequency periods of the first control signal;

a first rectifier coupled to the transformer to receive and rectify the relatively high frequency periods passed by the transformer to form a first pulse-width-modulated switch-control signal;

a second transformer to receive a second one of the control signals, the second transformer to pass the relatively high frequency periods of the second control signal and to block the relatively low frequency periods of the second control signal;

a second rectifier coupled to the second transformer to receive and rectify the relatively high frequency periods passed by the second transformer to form a second pulse-width-modulated switch-control signal; and a power transistor having a control terminal and first and second current-handling terminals, wherein the control terminal is coupled to the first and second rectifiers to receive the first and second pulse-width modulated switch-control signals and the first and second current-handling terminals are coupled to the first and second switch terminals, respectively.

9. The switch of claim 8, further comprising a node coupled to the first and second rectifiers and the control terminal to sum the first and second switch control signals.

10. The switch of claim 8, wherein the first pulse-width modulated switch-control signal holds the power transistor off during the relatively high frequency periods of the first control signals.

11. The switch of claim 8, further comprising a diode disposed between the rectifier and the control terminal and a second transistor having third and fourth current-handling terminals disposed between the control terminal and the second current-handling terminal of the power transistor.

12. The switch of claim 8, wherein the power transistor has a voltage rating less than the voltage between the first and second switch terminals.

13. The switch of claim 8, wherein the switching element is one of a plurality of similar switching elements coupled in series between the first and second switch terminals.

14. A method of modulating current flow through a plurality of switching elements connected in series between switch terminals, the method comprising:

delivering a plurality of control signals, each control signal modulated to include alternate periods of a relatively high frequency and a relatively low frequency;

rectifying each of the control signals to provide a plurality of rectified signals, each rectified signal exhibiting a first voltage during the periods of the relatively high frequency and a second voltage during the periods of the relatively low frequency; and turning each of the switching elements on and off using a first and a second of the rectified signals.

15. The method of claim 14, wherein turning each of the switching elements on and off using two of the rectified signals comprises, for each switch, turning the switch on during the periods of the relatively high frequency for the first rectified signal and turning the switch off during the periods of the relatively high frequency for the second rectified signal.

16. The method of claim 14, wherein turning each of the switching elements on and off using two of the rectified signals comprises, for each switch, turning the switch on during the periods of the relatively high frequency for the first and second rectified signals and turning the switch off during the periods of the relatively low frequency for the first and second rectified signals.

17. The method of claim 14, wherein the relatively high frequency is substantially the same frequency for each of the plurality of control signals.

18. The method of claim 14, wherein the relatively low frequency is substantially the same frequency for each of the plurality of control signals.

19. The method of claim 14, wherein the first and second of the rectified signals are phase aligned during the periods of the relatively high frequency.

20. A high-power switch for selectively passing a current between first and second switch terminals, the switch comprising:
   control circuitry including:
      a control node to provide a pulse-width modulated control signal;
      a diode having a first diode terminal connected to the control node and a second diode terminal, the diode to selectively pass the control signal to the second diode terminal;
      a control transistor having a first control terminal connected to the control node to receive the control signal, a first current-handling terminal connected to the second diode terminal, and a second current-handling terminal; and
      a power transistor having a second control terminal coupled to the first current-handling terminal and the second diode terminal, a third current-handling terminal coupled to the first switch terminal, and a fourth current-handling terminal coupled to the second current-handling terminal and the second switch terminal.

21. The high-power switch of claim 20, further comprising a resistor connected between the first control terminal and the second current-handling terminal.

22. The high-power switch of claim 20, further comprising a rectifier coupled to the control node to provide the pulse-width modulated control signal.

23. The high-power switch of claim 20, further comprising at least one additional power transistor connected in series with the power transistor between the first and second switch terminal.

24. The high-power switch of claim 23, further comprising second control circuitry similar to the control circuitry, the second control circuitry for turning the second power transistor on and off in synchronization with the power transistor.

* * * * *